United States Patent
Griffen et al.

(10) Patent No.: US 6,300,758 B1
(45) Date of Patent: Oct. 9, 2001

(54) MAGNETORESISTIVE SENSOR WITH REDUCED OUTPUT SIGNAL JITTER

(75) Inventors: Neil C. Griffen; Richard S. Stokes, both of Westerville, OH (US)

(73) Assignee: NorthStar Technologies Inc., Westerville, OH (US)

( * ) Notice: Subject to any disclaimer, the term of this patent is extended or adjusted under 35 U.S.C. 154(b) by 0 days.

(21) Appl. No.: 09/452,450

(22) Filed: Dec. 2, 1999

Related U.S. Application Data (63) Continuation of application No. 08/863,339, filed on May 27, 1997, which is a continuation-in-part of application No. 08/366,580, filed on Dec. 30, 1994, now Pat. No. 5,680,042.

(51) Int. Cl.$^7$ ............................ G01B 7/14; G01B 7/30; G01R 33/025
(52) U.S. Cl. ............................ 324/207.21; 324/207.12; 324/207.25
(58) Field of Search .................. 324/207.21, 207.22, 324/207.25, 173, 174, 252, 207.24, 225, 207.12; 338/32 R; 327/510; 33/706, 708

(56) References Cited

U.S. PATENT DOCUMENTS

| | | |
|---|---|---|
| 3,058,339 | 10/1962 | Shapiro . |
| 3,143,882 | 8/1964 | Brueckner . |

(List continued on next page.)

OTHER PUBLICATIONS

Data Sheet, Gurley Precision Instruments, Series 835H Hollow Shaft Encoders (Jan. 1994 or prior).
"Introduction to Encoders & Accessories, Excellence in Digital Measurements . . . ," *Dynapar/Veeder–Root,* no date.
Avtron Manufacturing, Inc. brochure, "Rotary Pulse Generators," Mar. 1991.

Wehmer, B.F., *Electromagnetic Tachometer,* IBM Tech. Discl. Bull. vol. 11, No. 7, Dec. 1968, pp. 746, 747.

Schartz, Lisa et al., "Rotary Optical Encoding Using An Integrated Sensor Array," 1992 Analog & Mixed–Signal Design Conference, Burlingame, CA, Oct. 28–30, 1992, 18 pages.

Li, Zhixin, "Performance enhancement of optical encoders for rotary laser beam scanners," *Micro–Optics/Micromechanics and Laser Scanning and Shaping, Proceedings SPIE—The International Society for Optical Engineering,* vol. 2383, San Jose California, Feb. 7–9, 1995, pp. 366–380.

(List continued on next page.)

*Primary Examiner*—Jay Patidar
(74) *Attorney, Agent, or Firm*—Nixon & Vanderhye P.C.

(57) ABSTRACT

A magnetoresistive sensor for use in detecting relative motion between the sensor and a further object bearing an alternating pattern of north/south magnetic poles. The sensor includes one or more pairs of magnetoresistive elements positioned so that each element within a pair magnetically complements the corresponding element in that pair. That is, whenever an element is exposed to a north pole of the magnetic pattern, a corresponding complementary element is exposed to a south pole so as to provide a magnetically complemented output. Such pair of complementary magnetoresistive elements are connected into a bridge circuit such that jitter effects caused by asymmetric magnetic fields and physical differences between sensor elements are cancelled. The quadrature sensor output is frequency multiplied to provide frequency multiplied output signals in quadrature. The sensing arrangement can be used, for example, in the context of a rotary encoder having a drum having a circumference covered with a magnetic track at a predetermined pitch, and may include a plurality of magnetoresistive elements positioned opposite the drum and connected in a bridge circuit such that when the drum rotates an output signal from the encoder indicates rotary motion of the drum.

13 Claims, 5 Drawing Sheets

U.S. PATENT DOCUMENTS

| | | |
|---|---|---|
| 3,436,655 | 4/1969 | Lundgreen . |
| 3,636,767 | 1/1972 | Duffy . |
| 3,764,888 | 10/1973 | Anderson . |
| 3,800,718 | 4/1974 | Johnson . |
| 3,814,934 | 6/1974 | Mesh et al. . |
| 3,997,782 | 12/1976 | Willits . |
| 4,199,719 | 4/1980 | Grob . |
| 4,274,053 | 6/1981 | Ito et al. . |
| 4,298,948 | 11/1981 | Davis . |
| 4,319,188 | 3/1982 | Ito et al. . |
| 4,350,952 | 9/1982 | Holt et al. . |
| 4,383,303 | 5/1983 | Hoffman . |
| 4,418,372 | 11/1983 | Hayashida et al. . |
| 4,429,276 | 1/1984 | Narimatsu et al. . |
| 4,506,217 | 3/1985 | Rothley et al. . |
| 4,578,624 | 3/1986 | Neki et al. . |
| 4,594,548 | 6/1986 | Takahashi et al. . |
| 4,628,259 | 12/1986 | Takahashi et al. . |
| 4,639,807 | 1/1987 | Sekizawa et al. . |
| 4,642,496 | 2/1987 | Kerviel et al. . |
| 4,656,377 | 4/1987 | Akiyama et al. . |
| 4,668,913 | 5/1987 | Vinal . |
| 4,686,472 | 8/1987 | Van Ooijen et al. . |
| 4,703,378 | 10/1987 | Imakoshi et al. ............... 360/113 |
| 4,712,064 | 12/1987 | Eckardt et al. . |
| 4,742,297 | 5/1988 | Heaton et al. . |
| 4,766,376 | 8/1988 | Takahashi et al. . |
| 4,786,870 | 11/1988 | Kawamata et al. . |
| 4,800,457 | 1/1989 | Kryder et al. . |
| 4,810,953 | 3/1989 | Huynh . |
| 4,816,948 | 3/1989 | Kamo et al. . |
| 4,818,939 | 4/1989 | Takahashi et al. . |
| 4,821,012 | 4/1989 | Kamo et al. ............... 338/32 R |
| 4,851,771 | 7/1989 | Ikeda et al. . |
| 4,853,631 | 8/1989 | Carmen . |
| 4,853,632 | 8/1989 | Nagano et al. . |
| 4,857,841 | 8/1989 | Hastings et al. . |
| 4,866,382 | 9/1989 | Carmen . |
| 4,874,053 | 10/1989 | Kimura et al. . |
| 4,890,059 | 12/1989 | Guentner . |
| 4,907,445 | 3/1990 | Okumura . |
| 4,914,387 | 4/1990 | Santos . |
| 4,914,389 | 4/1990 | Juds . |
| 4,922,197 | 5/1990 | Juds et al. . |
| 4,975,675 | 12/1990 | Becker . |
| 4,988,220 | 1/1991 | Christiansen et al. . |
| 4,992,733 | 2/1991 | Griebeler . |
| 5,019,776 | 5/1991 | Kawamata et al. . |
| 5,041,784 | 8/1991 | Griebeler . |
| 5,043,660 | 8/1991 | Hasegawa . |
| 5,047,716 | 9/1991 | Katagiri . |
| 5,081,416 | 1/1992 | La Croix . |
| 5,084,674 | 1/1992 | Lachmann et al. . |
| 5,216,363 | 6/1993 | Masaaki . |
| 5,231,597 | 7/1993 | Komatsu . |
| 5,243,280 | 9/1993 | Kusumi . |
| 5,293,125 | 3/1994 | Griffen et al. . |
| 5,386,642 | 2/1995 | Spies et al. . |
| 5,422,569 | 6/1995 | Nakahara et al. . |
| 5,430,374 | 7/1995 | Metz . |
| 5,654,633 | 8/1997 | Griffen et al. . |

OTHER PUBLICATIONS

Campbell, P., "Magnetic Rotary Position Encoders With Magneto–Resistive Sensors," *IEEE Fourth International Conference on Electrical Machines and Drives,* Conference Publication No. 310, London, England, pp. 359–363 (Sep. 13, 1989).

Rethberg, Arthur L., et al., "Optical Encoders Keep An Eye On Shaft Motion," *Power Transmission Design,* Mar. 1991, pp. 57–60.

Kikuchi, Y., et al., "Consideration for a High Resolution of Magnetic Rotary Encoder," *IEEE Transactions on Magnetics,* vol. 32, No. 5, Sep. 1996, pp. 4959–4961.

Engelhardt, K., et al., High–resolution position encoder, insensitive to misalignment, *Micro–Optical Technologies for Measurement, Sensors, and Microsystems, SPIE* vol. 2783, Jun. 12–13, 1996, Besancon, France, pp. 184–191.

Campbell, P., "Magnetoresistive sensors for rotary position encoders," *INTERMAG '90—International Magnetics Conference 9020112,* Brighton, UK, Mar. 1990, pp. 17–20.

MAGNETORESISTIVE SENSOR WITH REDUCED OUTPUT SIGNAL JITTER

This is a continuing application of application Ser. No. 08/863,339 filed May 27, 1997; which is a continuation-in-part of grandparent application Ser. No. 08/366,580 filed Dec. 30, 1994, now U.S. Pat. No. 5,680,042.

FIELD OF THE INVENTION

The present invention relates to a magnetoresistive sensor that finds particular application in rotating shaft encoders. In particular, the magnetoresistive sensor reduces jitter in the output signal created by asymmetries in sensed magnetic fields.

BACKGROUND AND SUMMARY OF THE INVENTION

Magnetoresistive sensors are based on the principle that the resistance of a ferromagnetic material changes when subjected to a magnetic flux. Magnetoresistive sensors have numerous applications including ascertaining shaft rotation parameters (position, acceleration, etc.) in the context of encoders, tachometers, etc. In this regard, U.S. Pat. No. 5,293,125 entitled "Self Aligning Tachometer With Interchangeable Elements For Different Resolution Outputs" assigned to the present assignee is incorporated herein by reference. In these applications, magnetoresistive sensors detect changes, in magnetic fields to measure motion.

Figure 1:
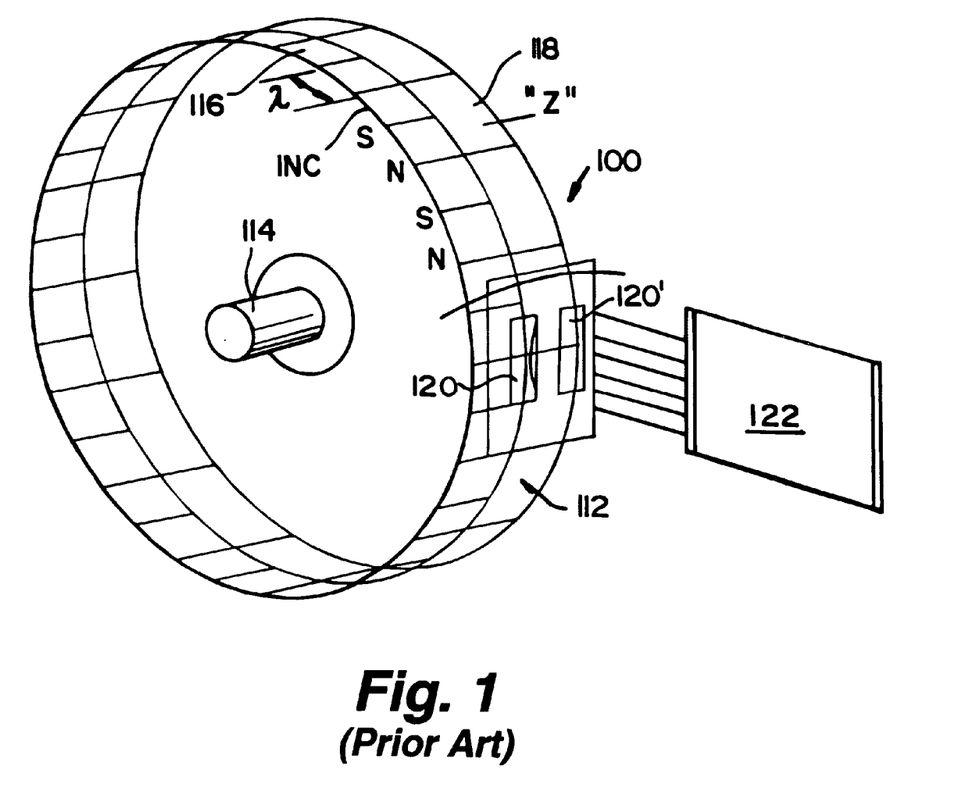
FIG. 1 is a schematic illustration of a magnetic drum having one or more magnetic tracks disposed on its peripheral surface and magnetoresistive elements and associated sensing and conditioning circuitry.

FIG. 1 shows one application of the present embodiment in which a magnetic drum 100 includes a peripheral surface 112 having two distinct tracks: an incremental or INC track 116 and an index or Z track 118. The rotary drum 100 is mounted to a shaft 114 which may be connected for example to a motor (not shown). The INC track 116 provides pulses indicating incremental shaft rotation and comprises an alternating series of magnetic north and south poles magnetically imprinted on the drum periphery 112 at a predetermined pitch $\lambda$ which may be on the order of hundreds of microns, (e.g., 747 microns in the preferred embodiment). Depending on the diameter of the drum 100, the peripheral surface 112 may encode a large number of pulses per revolution, (e.g., 480, 512, 600, etc.) The Z track 118 is used to generate one output pulse per revolution of the drum and thus provides information concerning the number of shaft revolutions and the absolute shaft position. Accordingly, whenever a Z pulse is generated, the motor shaft is known to be at a particular absolute position relative to the magnetoresistive sensor module 120.

Magnetoresistive sensor module 120 and 120' include a plurality of magnetoresistive elements positioned adjacent to and separated by a predetermined gap from the drum peripheral surface 112 as will be described in more detail below. The magnetoresistive INC track 116 has corresponding sensor module 120, and the Z track 118 has corresponding sensor module 120'. Both sensor modules 120 and 120' are connected to signal sensing and conditioning circuitry 122.

Figure 2A:
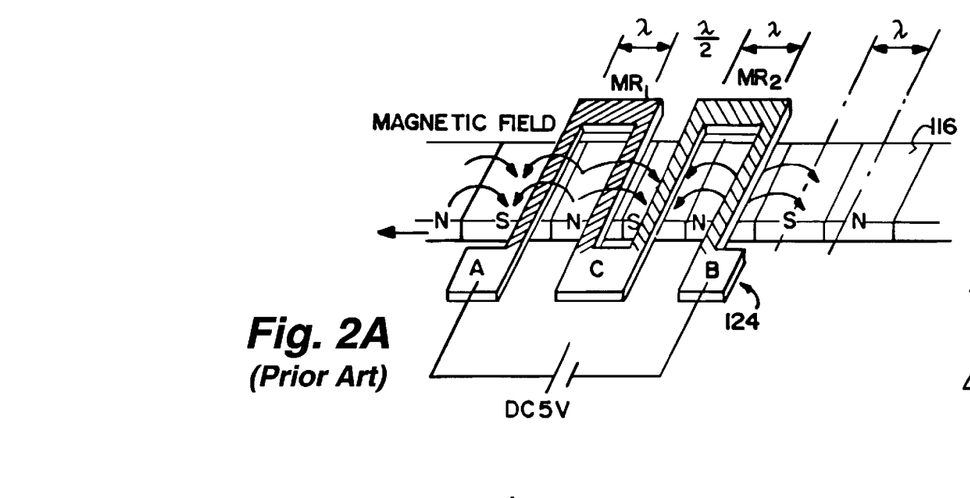
FIG. 2A is a perspective view of two magnetoresistive elements disposed above the magnetized track formed on the periphery of the magnetic drum.

Each of the magnetoresistive sensors 120, 120' consists of a glass substrate covered with a thin film permalloy, e.g., a Ni—Fe film, which is photoetched into a pattern of individual elements which are connected to the sensing and signal conditioning circuitry 122 via one or more flexible leads. Reference is made to FIG. 2(a) which is a perspective view of a portion of the magnetized INC track 116 showing the adjacent north and south poles (N, S) on its incremental track and plural magnetoresistive elements 124 including elements $MR_1$ and $MR_2$ with connecting nodes A, B, and C, a DC voltage being connected to nodes A and B. As can be seen from the drawing, the magnetoresistive elements are formed parallel to each other and to the north and south poles formed on the peripheral surface of the drum 112. The magnetoresistive elements are typically spaced some fraction of the pitch distance $\lambda$ separating each adjacent magnetic pole, e.g. $\lambda/2$ in FIG. 2(a).

Figure 2B:
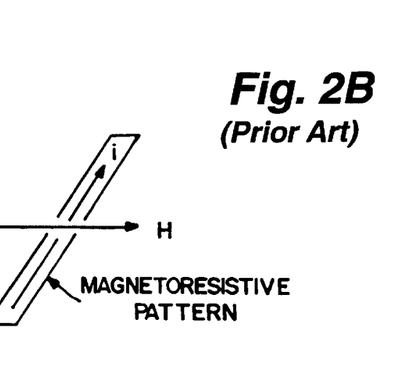
FIG. 2B illustrates the relationship between current generated in a magnetoresistive pattern or strip as the result of a transverse magnetic field.
Figure 2C:
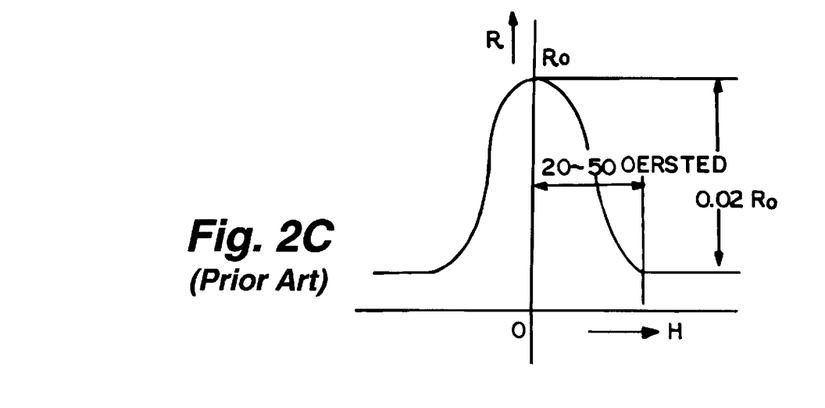
FIG. 2C is a graph illustrating how the resistance of the magnetoresistor changes with increasing magnetic fields.

FIG. 2(b) shows a current i generated in a linear magnetoresistive strip in response to an orthogonal magnetic field H. As shown in FIG. 2(c), the magnetoresistive strip experiences a drop in electrical resistance R (corresponding to an increase in current i) in the presence of the saturated magnetic field H. More specifically, the electrical resistance R of the thin film magnetoresistive pattern inversely varies in accordance with the strength of magnetic field H which intersects a perpendicular current i running through the magnetoresistive pattern as shown. In theory, the change in resistance R is independent of the polarity of the magnetic field H. However, as will be described in more detail below, this assumption is not reliable in practical magnetoresistive sensor applications.

Figure 2D:
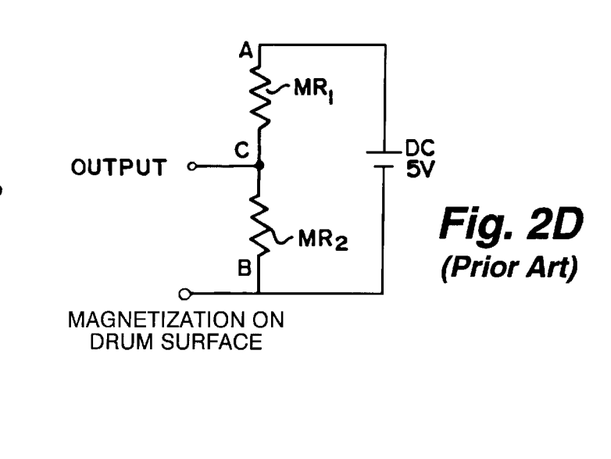
FIG. 2(D) is a bridge circuit illustrating how the magnetoresistive elements of FIG. 2(a) are connected in a differential bridge configuration.

Referring to FIG. 2(d), the magnetoresistive sensor elements $MR_1$ and $MR_2$ are conventionally connected in a resistive bridge array so as to provide differential outputs e.g., the output signal is taken from node C. Note as the drum 100 rotates the magnetic pole pattern on INC track 116 past the magnetoresistive sensor elements $MR_1$ and $MR_2$, an AC output generated at bridge circuit node C corresponds to the movement of the magnetic pole pattern and therefore the rotation of the drum 100.

Figure 3:
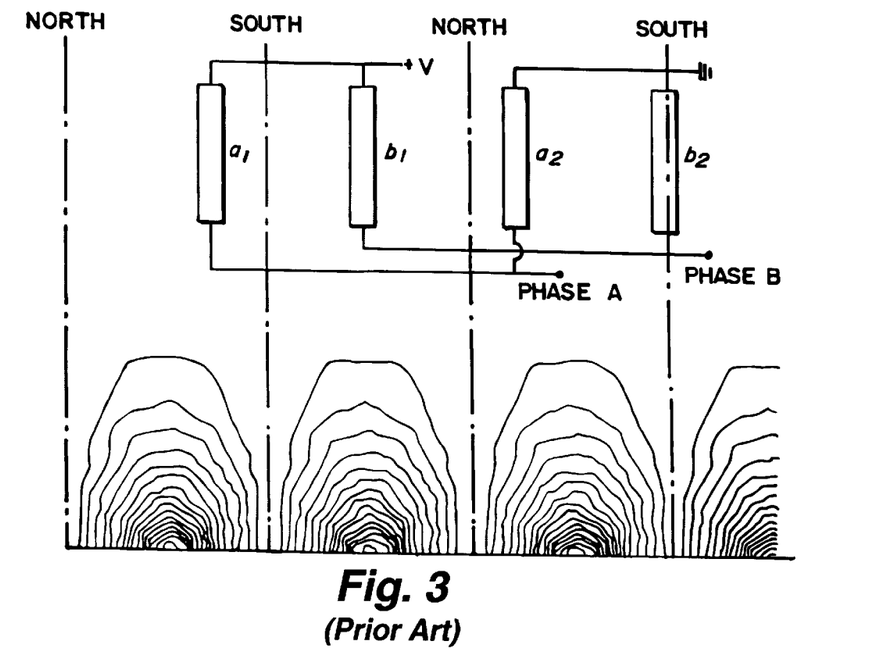
FIG. 3 is an illustration of how magnetoresistive elements are positioned above a magnetic field plot generated by the north/south poles formed on the magnetic drum in order to obtain different phase/quadrature output signals.

Magnetoresistive sensors are designed to increase the output voltage level and to improve the temperature properties of the device by making bridge connections between several elements. Two phase outputs (i.e., A and B phases) are typically obtained from the sensor by offsetting the magnetoresistive sensor's pattern of elements from the north-south pole pattern on the INC track 116 of the magnetic drum 100 by one quarter of the pole pitch $\lambda$. FIG. 3 illustrates a simple configuration of magnetic resistive elements $a_1$, $b_1$, $a_2$, and $b_2$ positioned parallel to and above the magnetic pole surface corresponding magnetic field lines between four adjacent poles. One phase or channel of a magnetoresistive sensor comprises two magnetoresistive strips displaced an odd multiple of a half pole pitch from each other which in the layout in FIG. 3 is $3\lambda/2$. As the drum 100 rotates one pole pitch $\lambda$, the one channel sensor output (which can be assumed for simplicity to be an approximately sinusoidal output waveform) completes one cycle having a particular phase A. A quadrature signal (phase B) which is 90° out of phase from phase A is generated by the B channel magnetoresistive sensor elements B1 and B2 which are formed on the same substrate as elements A1 and A2 but displaced an odd multiple of a quarter pole pitch from the first pair A1, A2.

Figure 4:
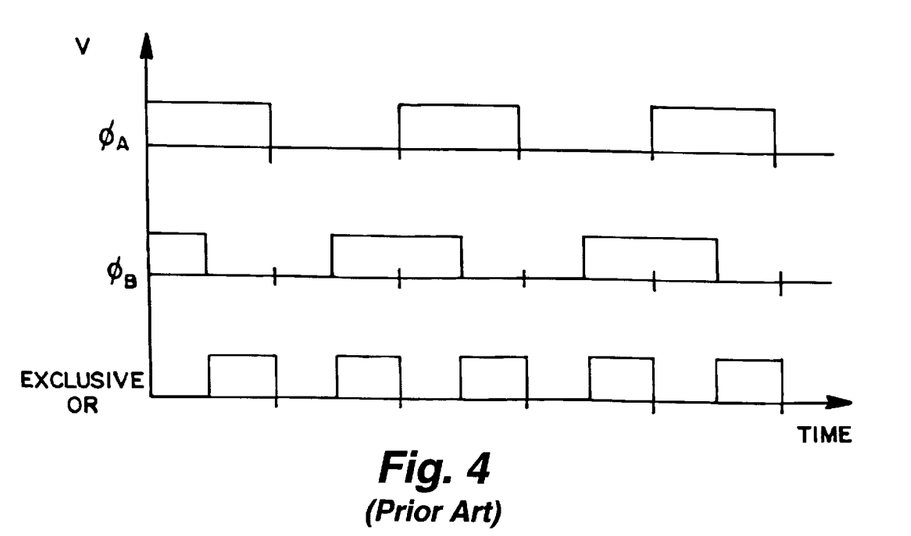
FIG. 4 is a graph of simplified waveforms indicating the quadrature relationship between phase A, phase B, and a double frequency generated by exclusive-ORing the two quadrature phases.

The phase A and phase B bridge outputs are typically amplified and converted into square waveforms using conventional comparators or other zero crossing detection methods. The square waveforms for phases A ($\Theta_A$) and B ($\Theta_B$) shown in FIG. 4 are in a quadrature relationship, i.e. $\Theta_A$ leads $\Theta_B$ by 90°. By combining the two quadrature phases $\Theta_A$ and $\Theta_B$ in an exclusive-OR gate, a single channel output of twice the frequency of the quadrature signals is obtained. This means that the output resolution of the magnetoresistive sensor is "doubled" without any increase in the number of magnetized poles formed on the rotary drum peripheral surface. Such sensors are referred to as frequency doubling sensors and achieve higher resolution without having to increase the manufacturing accuracy that would otherwise be required to make smaller magnetized poles on the rotary drum. In theory, additional exclusive-OR outputs may be recombined using further exclusive OR-gates to produce even higher resolutions by frequency tripling, quadrupling, etc. Although the present invention may be applied to frequency tripling, quadrupling, etc. embodiments, the present invention is described in the context of a frequency doubling sensor for the sake of simplicity.

Figure 5:
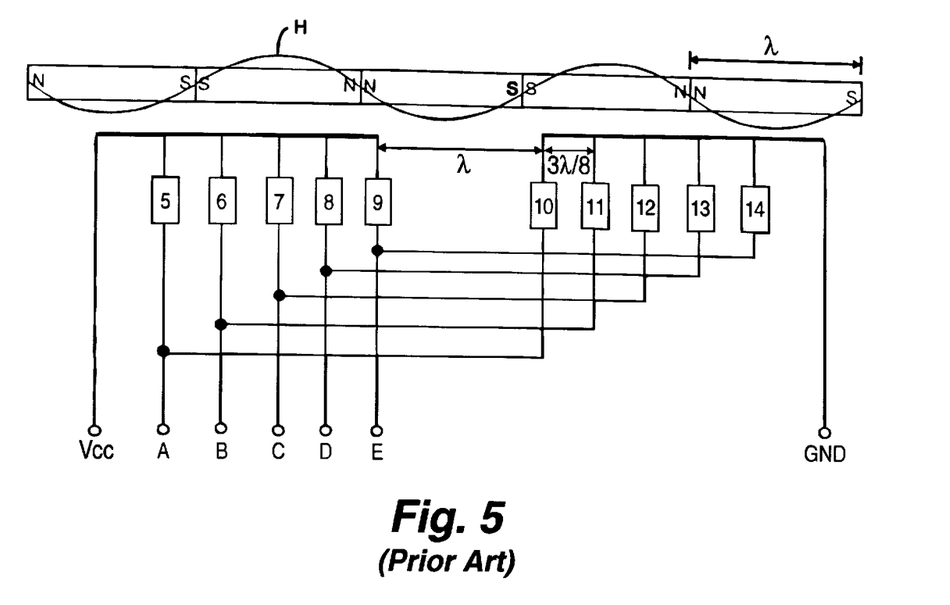
FIG. 5 illustrates the positional relationship of individual magnetoresistive elements provided in a frequency doubling magnetoresistive sensor with respect to the magnetic pole pattern formed on the magnetic drum.

A frequency doubling magnetoresistive sensor is shown in FIG. 5. The magnetoresistive sensor includes two sets of five magnetoresistive elements, the first set including elements 5–9 and second set including elements 10–14. The first and second sets of magnetoresistive elements are separated by one drum magnetic pole pitch $\lambda$. Each magnetoresistive element within a group is spaced by some fraction of the pitch, e.g., by $3\lambda/8$. Magnetoresistive elements 5–9 are connected to power supply Vcc which may be for example 5 volts. The other terminals of magnetoresistive elements 5–9 are connected to output terminals A–E and to terminals of corresponding magnetoresistive elements 10–14 from the second set. The other terminal of magnetoresistive elements 10–14 is connected to ground.

Figure 6:
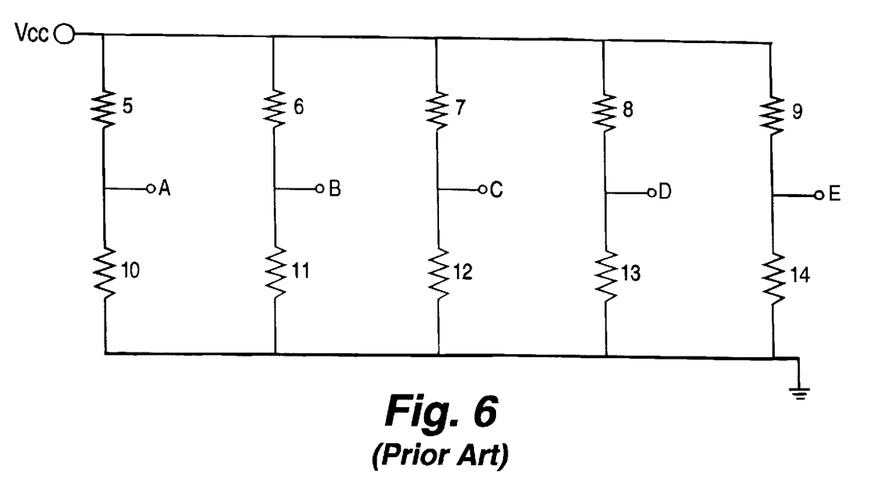
FIG. 6 is a electrical schematic showing the bridge circuit formed by connecting certain ones of the magnetoresistive elements of the magnetoresistive sensor illustrated in FIG. 5.

The bridge circuit schematic formed by the magnetoresistive sensor shown in FIG. 5 is illustrated in FIG. 6. Note that the magnetic field H generated by the magnetic poles formed on the drum shown in FIG. 5 is approximated as a sinusoid and assumes that the magnitude of all positive magnetic fields are identical to each other and all negative fields are identical to each other. If it could be further assumed that the positive field has the same magnitude as the negative field and that therefore the negative and positive fields are symmetric, the bridge outputs A–E could be combined to generate a frequency doubled square wave output having a constant period T. In other words, if it could be assumed that the magnetic fields generated from the magnetic pole drum pattern are uniform in magnitude and from pole to pole, the square wave output would be completely uniform.

In practice, the magnetic pole pattern formed on the drum surface is not symmetric, and the positive and negative magnetic fields may have different magnitudes. As a result of the fields generated from the magnetic pattern not repeating exactly from pole to pole, i.e., asymmetries in the detected magnetic field, the square waves generated by the bridge circuit do not have a uniform and constant period. This nonuniformity or variation in the period of the generated square waves is defined as "period jitter" or simply "jitter." More formally, jitter is defined as follows:

$$\text{jitter} = \frac{(\text{maximum period} - \text{minimum period})}{(\text{average period})} \times 100\%$$

In this definition, jitter is expressed as a percentage of the average period with 0% corresponding to no jitter.

Current encoders which employ frequency doubling magnetoresistive sensors produce jitter as high as twenty-five percent. However, jitter of less than five percent is desirable. Factors that contribute to the magnetic pole asymmetry that causes jitter include:

Hysteresis or bias of the magnetoresistive sensor material which occurs when the sensor material reaches maximum resistance at some magnetic field intensity other than zero. Sensor bias also occurs when the sensor is more sensitive to a magnetic field having one polarity than to a field of the same magnitude in the opposite pole direction.

Variations in the shape of the sensor output signal. Variations in the gap separation between the magnetized drum and the magnetoresistive sensor and third harmonic distortions and imperfections in the magnetized surface cause distortions in the output signal. These are often a function of or related to the direction of the magnetic field.

Misalignment of the sensor with respect to the magnetized pattern. This causes a distortion in the sensor output that manifests itself in part as a variation in the sensed field.

The present invention substantially reduces jitter in magnetoresistive sensors. A magnetoresistive sensor in accordance with the present invention includes one or more magnetoresistive elements positioned in array of magnetoresistive elements for detecting a changing magnetic field having an alternating polarity caused by relative movement between the magnetoresistive elements and a magnetized pattern wherein the one or more complementary magnetoresistive elements are positioned substantially 180° out of magnetic phase thereby compensating for and substantially cancelling the effects of jitter. By placing one or more pairs of complementary elements substantially 180° out of phase, asymmetric magnetic fields, individual physical differences between the sensors, sensor bias/hysteresis, distortion, and other nonuniformities are compensated. Each pair of complementary elements is combined in one leg of a bridge circuit where the output of each leg of the bridge circuit produces a waveform having a substantially constant period.

The present invention encompasses a rotary encoder having a drum having a circumference covered with a magnetic track having a predetermined pitch between magnetic poles and a magnetoresistive sensor. The sensor includes a plurality of magnetoresistive elements positioned opposite the drum and connected in a bridge circuit such that when the drum rotates, an output signal from the bridge indicates a rotary angle of the drum. The magnetoresistive elements include one or more elements positioned at a distance of one pitch from one or more other corresponding elements.

A method of making a magnetoresistive sensor having a plurality of parallel magnetoresistive elements includes positioning first magnetoresistive elements in a first series of locations and positioning one or more complementary magnetoresistive elements in one or more second locations so that the one or more complementary magnetoresistive elements are substantially 180° out of phase of a corresponding one or more of the first magnetoresistive elements. By making the magnetoresistive sensor in this way, signals generated by each corresponding pair of first element and a complementary element may be averaged to cancel nonsymmetric responses thereby reducing jitter.

DETAILED DESCRIPTION OF THE DRAWINGS

In the following description, for purposes of explanation and not limitation, specific details are set forth, such as particular circuits, circuit components, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 7:
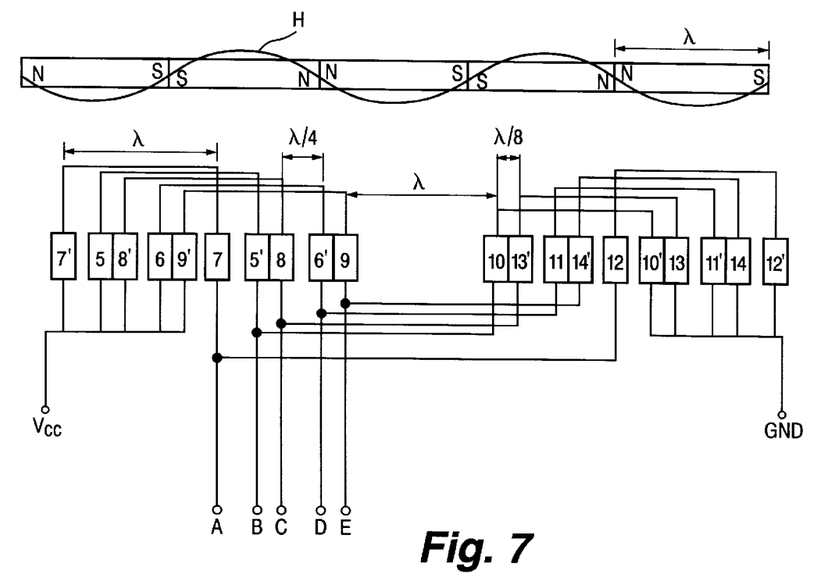
FIG. 7 illustrates a magnetoresistive sensor in accordance with a preferred embodiment of the present invention.

Referring to FIG. 7, a magnetoresistive sensor design in accordance with a preferred embodiment of the present invention is illustrated. In contrast to the frequency doubling sensor illustrated in FIG. 5 which includes ten total sensor elements grouped into two sets of five (i.e. 5–9 and 10–14), this example of the magnetoresistive sensor according to a preferred embodiment of the present invention in a frequency doubling context includes twice the number of magnetoresistive elements. However, the present invention is not limited to a particular number of elements. Ten magnetoresistive elements in a first set of elements (7', 5, 8', 6, 9', 7, 5', 8, 6', and 9) are separated by one pitch λ from a second set of ten magnetoresistive elements (10, 13', 11, 14', 12, 10', 13, 11', 14, and 12). Each of the unprimed magnetoresistive elements (5–14) includes a corresponding primed magnetoresistive element (5'–14') so that pairs of complementary primed and unprimed elements are formed, e.g. 7 and 7', 12 and 12', etc. The primed and the nonprimed magnetoresistive elements in the pair are positioned along the magnetic pole pattern such that they are substantially 180° out of magnetic phase. Thus, element 7 is adjacent to a positive polarity magnetic field, and its complementary magnetoresistive element 7' is spaced one magnetic pole pitch λ distance away at a position where the same magnitude but opposite polarity negative magnetic field exists. In other words, elements 7 and 7' are positioned at the same relative position between magnetic poles but in opposite polarity fields. This positional/magnetic phase relationship is established for each pair of complementary elements.

In this embodiment, each element and its complement in the first set of magnetoresistive elements 5–9 are connected in series between voltage supply Vcc and bridge output terminals A–E. Each magnetoresistive element in the second set of elements 10–14 and its complement 10'–14' are connected in series between output terminals A–E and ground. Although complementary pairs of magnetoresistive elements have been shown connected in series in each half "leg" of the bridge, they could also be connected in parallel in each half bridge leg.

Figure 8:
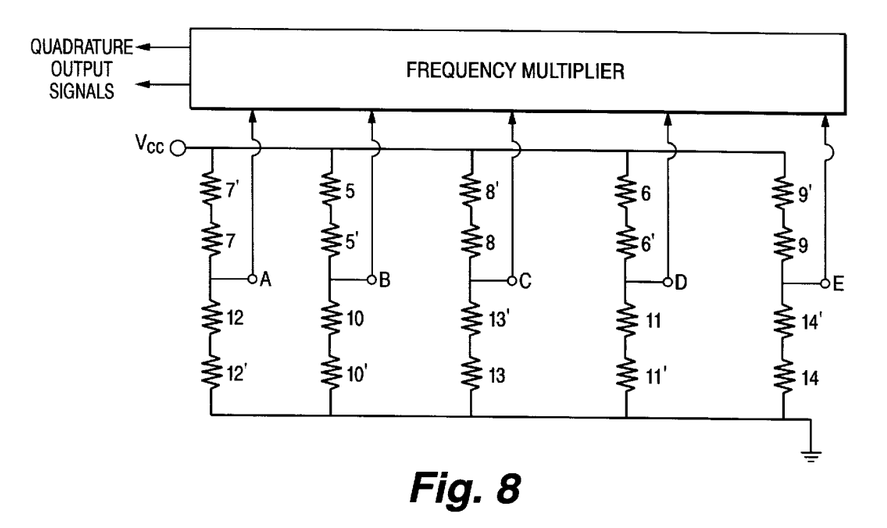
FIG. 8 is a bridge circuit corresponding to the magnetoresistive sensor element configuration shown in FIG. 7.

FIG. 8 illustrates the resulting bridge array including a resistive network having plural "legs" wherein a pair of complementary magnetoresistive elements from the first group, e.g. 7 and 7' are connected in series with an associated pair of complementary magnetoresistive elements from the second set (i.e. 12 and 12'). Electrical current flows through the plural bridge legs and output nodes A–E provide a differential voltage level which indicates the relative magnitudes of current flowing through the legs. As the magnetoresistive elements sensor change in resistance due to changes in magnetic flux caused by the magnetic drum rotating past the sensor, the current flowing through the plural bridge legs changes thereby causing a responsive change in the differential voltage level produced by the bridge at each output node. In this way the bridge array generates a changing voltage output level responsive to the magnetic flux sensed by the associated magnetoresistive elements.

The outputs of the bridge circuit in FIG. 8 are processed and shaped to form square wave output and then combined to form quadrature outputs to provide a frequency doubling function using conventional circuitry such as that disclosed for example in U.S. Pat. No. 5,293,125 incorporated by reference above.

The complementary pairs of magnetoresistive elements in the magnetoresistive sensor effectively implements a magnetic pole time domain cancellation. By connecting the complementary elements such that the primed and unprimed complementary elements are in the same quarter bridge (either in parallel or in series) the detected magnetic polarity asymmetries caused by periodic distortions in the detected magnetic field related to the direction of the magnetic field sensor hysteresis or bias distortions and imperfections, and other factors which contribute to jitter are substantially cancelled. Alternatively, a limited number of complementary "pairs" could be used so that, for example, some sensor elements might have a complementary element and some sensor elements might not.

It is preferred that each unprimed element includes a corresponding primed complementary element positioned to achieve optimal jitter cancellation. However, in accordance with the present invention, jitter can still be cancelled, but to a lesser degree, using only one complementary element. Therefore, the present invention may be practiced with one complementary element corresponding to only one unprimed element in the first set, a number of complementary elements less than the total number in the first set, or a complete second set of corresponding complementary elements. Increasing the number of complementary elements increases the amount of jitter cancelled.

Since jitter is basically due to magnetic pole asymmetry, the present invention in the preferred embodiment effectively implements a two signal averaging technique such that a north pole sensor element and a south pole sensor element are averaged together via connection in a half leg of the bridge. Of course, other circuits and/or techniques may be used to implement the sensor element averaging. In addition, more than two signals could be averaged together to achieve the jitter cancellation effect as long as the elements being averaged are positioned in the magnetoresistive element array such that they compensate for asymmetric nonuniformities. Jitter values for a frequency doubling magnetoresistive sensor designed in accordance with the present invention achieved jitter values of less than one percent. Accordingly, the present invention can be used to great advantage to increase the accuracy and reliability of magnetoresistive sensors used, for example, in high precision rotary encoders.

The present invention also includes methods of making a magnetoresistive sensor for detecting a changing magnetic field with substantially reduced jitter. For example, a first set of magnetoresistive elements is positioned in a first set of locations corresponding to the locations of the unprimed elements in FIG. 7. A second set (including a set of one, a partial set, and a complete set) of complementary magnetoresistive elements is positioned in a second series of locations corresponding to the primed magnetoresistive elements illustrated in FIG. 7. These locations are selected such that the first and second sets of magnetoresistive elements are positioned substantially 180° out of phase with respect to the change in magnetic field. Individual elements from the first and second sets are combined in a bridge circuit to cancel out asymmetries in the detected magnetic field.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A self-canceling low jitter magnetoresistive sensor for, in use, sensing a pattern of north and south magnetic poles carried by a carrier, said magnetoresistive sensor comprising:

at least first, second, third and fourth magnetoresistive elements for, in use, magnetically sensing said pattern on said carrier, said first, second, third and fourth magnetoresistive elements being arranged and spaced apart such that when said first element is exposed to a north pole said second element is exposed to a south pole and said third and fourth elements are each between north and south magnetic poles, and when said third element is exposed to a north pole said fourth element is exposed to a south pole and said first and second elements are each between north and south magnetic poles;

a first arrangement of electrical conductors that electrically connects said first and second elements together to form a first quarter-bridge circuit, electrically connects said third and fourth elements together to form a second quarter-bridge circuit, and electrically connects said first and second quarter-bridge circuits together to form a half-bridge circuit that, in use, produces a first substantially periodic signal having a first frequency;

a plurality of additional magnetoresistive elements; and additional arrangements of electrical conductors that electrically connect said additional magnetoresistive elements together to form additional half-bridge circuits that, in use, produce additional substantially periodic signals having substantially said first frequency, said substantially periodic signals being phase shifted with respect to one another to facilitate production of responsive frequency multiplied outputs in quadrature.

2. The sensor of claim 1 wherein the said substantially periodic signals are substantially sinusoidal.

3. The sensor of claim 1 wherein the said first, second, third, fourth and additional magnetoresistive elements are disposed on a common substrate.

4. The sensor of claim 1 wherein the said pattern provides a periodic magnetic scale and, in use, the said substantially periodic signals produced provide speed and direction information related to the relative motion between said sensor and said periodic magnetic scale.

5. A self-canceling low jitter magnetoresistive sensor for detecting changing magnetic fields generated by relative motion between said sensor and a further object bearing a pattern of alternating magnetic poles separated by a predetermined pitch, said sensor comprising:

a first plurality of magnetoresistive sensor elements;

a second plurality of magnetoresistive sensor elements;

a mounting arrangement that spaces at least some elements of said second plurality of magnetoresistive elements by a predetermined spacing related to said pitch from corresponding elements of said first plurality of magnetoresistive sensor elements such that when an element of said second plurality is exposed to a north magnetic pole a corresponding element of said first plurality is exposed to a south magnetic pole;

electrical conductors electrically connecting at least some of the magnetoresistive elements within said second plurality of magnetoresistive elements to corresponding magnetoresistive elements within said first plurality of magnetoresistive elements to form a plurality of half-bridge circuits, wherein at least one of said plurality of half-bridge circuits includes a quarter-bridge circuit containing at least one of said second plurality of magnetoresistive elements and at least one corresponding element of said first plurality of magnetoresistive elements;

wherein, in use, said plurality of half-bridge circuits produce substantially periodic signals that are phase shifted with respect to one another such that when electronically conditioned and combined, at least a pair of frequency multiplied output signals in quadrature are produced.

6. The sensor of claim 5 wherein the said substantially periodic signals are substantially sinusoidal.

7. The sensor of claim 5 wherein the mounting arrangement comprises a common substrate on which said first and second pluralities of magnetoresistive sensors are disposed.

8. The sensor of claim 5 wherein the pattern defines a periodic magnetic scale and, in use, the periodic signals produced provide speed and direction information related to the relative motion between said sensor and the periodic magnetic scale.

9. A self-canceling low jitter magnetoresistive sensor for detecting changing magnetic fields generated by relative motion between said sensor and a further object bearing a pattern of alternating north/south magnetic poles separated by a predetermined pitch, said sensor comprising;

at least first, second and third magnetoresistive elements and at least first, second and third corresponding complementary magnetoresistive elements wherein, said first complementary magnetoresistive element is spaced apart by a predetermined spacing related to said pitch from the corresponding first magnetoresistive element so as to magnetically complement said first magnetoresistive element and thereby compensate for differences in magnetic pole response characteristics, said second complementary magnetoresistive element is spaced apart by a predetermined spacing related to said pitch from the corresponding second magnetoresistive element so as to magnetically complement said second magnetoresistive element and thereby compensate for differences in magnetic pole response characteristics, and said third complementary magnetoresistive element is spaced apart by a predetermined spacing related to said pitch from the corresponding third magnetoresistive element so as to magnetically complement said third magnetoresistive element and thereby compensate for differences in magnetic pole response characteristics, wherein, in use, at least said first, second, and third magnetoresistive elements and said first, second and third complementary magnetoresistive elements magnetically sense said pattern on said object, said magnetoresistive elements being arranged and spaced apart from one another such that when said first element is exposed to a north pole said first complementary element is exposed to a south pole, when said second element is exposed to a north pole said second complementary element is exposed to a south pole, and when said third magnetoresistive element is exposed to a north pole said third complementary element is exposed to a south pole;

an electrical conductor arrangement that electrically connects said first element and said first complementary element together to form a first quarter-bridge circuit, electrically connects said second element and said second complementary element together to form a second guarter-bridge circuit, and electrically connects said third element and said third complementary element together to form a third guarter-bridge circuit, wherein, in use, said first, second and third guarter-bridge circuits produce substantially periodic signals phase shifted with respect to one another so as to facilitate production of responsive frequency multiplied outputs in quadrature, wherein said first and second magnetoresistive elements are spaced apart by a first spacing, said second and third magnetoresistive elements are spaced apart by a second spacing different from said first spacing, and said first and third magnetoresistive elements are spaced apart by a third spacing that is different from said first spacing and said second spacing, to provide non-uniform spacing between said first, second and third magnetoresistive elements.

10. A self-canceling low jitter magnetoresistive sensing arrangement for, in use, detecting changing magnetic fields generated by relative motion between said sensing arrangement and a further object bearing a magnetic pole pattern providing alternating north/south magnetic poles separated by a predetermined pitch, said sensing arrangement comprising:

a substrate shaped and dimensioned to be magnetically coupled to said further object;

a first plurality of magnetoresistive sensing elements disposed on said substrate and spaced apart by a spacing related to said pitch;

a second plurality of magnetoresistive sensing elements disposed on said substrate and spaced apart by a spacing related to said pitch, at least some of said second plurality of magnetoresistive sensing elements being spaced by a predetermined spacing related to said pitch from a corresponding magnetically complementary one of said first plurality of magnetoresistive sensing elements such that when a magnetoresistive sensing element in the first plurality is moved to a north pole of said pattern, a further, complementary magnetoresistive sensing element in the second plurality of magnetoresistive sensing elements is exposed to a south pole of said pattern so as to provide a magnetically complemented output;

an electrical connecting circuit that electrically connects at least some of said first plurality of magnetoresistive elements to corresponding complementary magnetoresistive sensor elements in the second plurality of magnetoresistive sensing elements to form a plurality of quarter-bridge circuits, wherein at least one of said plurality of quarter-bridge circuits contains at least one of said second plurality of magnetoresistive elements and at least one corresponding element of said first plurality of magnetoresistive elements;; and a frequency multiplier circuit electrically connected to said quarter-bridge circuits that produces at least a pair of frequency multiplied output signals in quadrature.

11. A self-canceling low jitter magnetoresistive sensing arrangement as in claim 10 wherein said further object provides a circumferential surface, and said sensing arrangement is dimensioned to sense said magnetic pole pattern borne by said circumferential surface.

12. An encoder comprising:

an enclosure at least partially enclosing a carrier; and a self-canceling low jitter magnetoresistive sensor operatively coupled to said enclosure for, in use, sensing a pattern of north and south magnetic poles carried by the carrier, said magnetoresistive sensor comprising:

at least first, second, third and fourth magnetoresistive elements for, in use, magnetically sensing said pattern on said carrier, said first, second, third and fourth magnetoresistive elements being arranged and spaced apart such that when said first element is exposed to a north pole said second element is exposed to a south pole and said third and fourth elements are each between north and south magnetic poles, and when said third element is exposed to a north pole said fourth element is exposed to a south pole and said first and second elements are each between north and south magnetic poles;

a first arrangement of electrical conductors that electrically connects said first and second elements together to form a first quarter-bridge circuit, electrically connects said third and fourth elements together to form a second quarter-bridge circuit, and electrically connects said first and second quarter-bridge circuits together to form a half-bridge circuit that, in use, produces a first substantially periodic signal having a first frequency;

a plurality of additional magnetoresistive elements; and additional arrangements of electrical conductors that electrically connect said additional magnetoresistive elements together to form additional half-bridge circuits that, in use, produce additional substantially periodic signals having substantially said first frequency, said substantially periodic signals being phase shifted with respect to one another to facilitate production of responsive frequency multiplied outputs in quadrature.

13. An encoder comprising:

an enclosure at least partially enclosing an object bearing a pattern of alternating north/south magnetic poles separated by a predetermined pitch; and a self-canceling low jitter magnetoresistive sensor operatively coupled to said enclosure for detecting changing magnetic fields generated by relative motion between said sensor and said object, said sensor comprising:

a first plurality of magnetoresistive sensor elements;

a second plurality of magnetoresistive sensor elements;

a mounting arrangement that spaces at least some elements of said second plurality of magnetoresistive elements by a predetermined spacing related to said pitch from corresponding elements of said first plurality of magnetoresistive sensor elements such that when an element of said second plurality is exposed to a north magnetic pole a corresponding element of said first plurality is exposed to a south magnetic pole;

electrical conductors electrically connecting at least some of the magnetoresistive elements within said second plurality of magnetoresistive elements to corresponding magnetoresistive elements within said first plurality of magnetoresistive elements to form a plurality of quarter-bridge circuits, wherein at least one of said plurality of quarter-bridge circuits contains at least one of said second plurality of magnetoresistive elements and at least one corresponding element of said first plurality of magnetoresistive elements;

additional electrical conductors electrically connecting additional elements with said plurality of quarter-bridge circuits to form a plurality of half-bridge circuits;

wherein, in use, said plurality of half-bridge circuits produce substantially periodic signals that are phase shifted with respect to one another such that when electronically conditioned and combined, at least a pair of frequency multiplied output signals in quadrature are produced.

\* \* \* \* \*